United States Patent [19]
Kesler

[11] Patent Number: 6,127,974
[45] Date of Patent: Oct. 3, 2000

[54] DIRECTION FINDING APPARATUS

[75] Inventor: Oren B. Kesler, Plano, Tex.

[73] Assignee: Raytheon Company, Lexington, Mass.

[21] Appl. No.: 09/163,230

[22] Filed: Sep. 29, 1998

[51] Int. Cl.[7] .................................................. G01S 5/02
[52] U.S. Cl. ............................................................ 342/417
[58] Field of Search .................................... 342/417, 451

[56] References Cited

U.S. PATENT DOCUMENTS 5,355,141  10/1994  Graham et al. .
5,495,256   2/1996  Piper .
5,768,477   6/1998  Johnson et al. .
5,892,700   4/1999  Haardt ...................................... 364/807

FOREIGN PATENT DOCUMENTS 0 448 994 A1  10/1991  European Pat. Off. .
10-227846      8/1998  Japan .

*Primary Examiner*—Theodore M. Blum
*Attorney, Agent, or Firm*—Baker Botts L.L.P.

[57] ABSTRACT

An efficient monopulse direction finding technique is based on the best algorithm in the least squares sense for a given antenna configuration. The algorithm simultaneously uses complex voltage data from all of the antenna ports, i.e., all of the available data received. No a priori emitter polarization information is assumed. Only a two dimensional search for the performance index minimum is needed to find the solution. The method is extended to N emitters with a search in only 2N space for the N emitter angles.

15 Claims, 1 Drawing Sheet

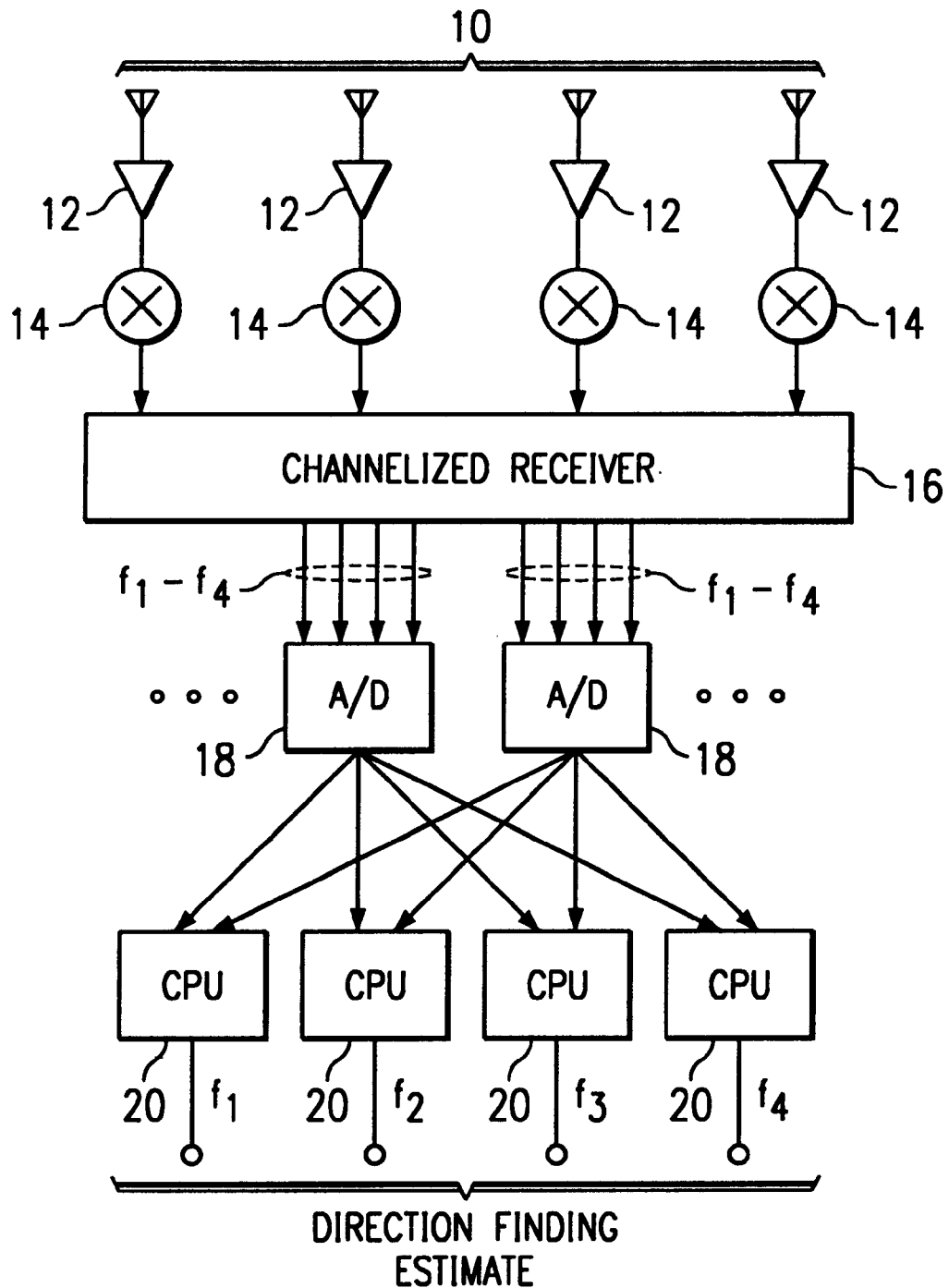

DIRECTION FINDING APPARATUS

TECHNICAL FIELD OF THE INVENTION

The present invention relates to direction finding and, in particular, to a direction finding apparatus that is based on an algorithm that simultaneously uses complex voltage data from a plurality of antenna ports, i.e., all of the available data received, and in which no a priori emitter polarization information is assumed.

BACKGROUND OF THE INVENTION

The present invention addresses the following direction finding problem: given voltage measurements at N antenna ports, find the angle of arrival of an emitter source without a priori knowledge of its polarization. That is a four dimensional identification problem. There are two angle parameters and two polarization parameters. Previously known direction finding algorithms have been devised for implementation by simple analog hardware. As a result the algorithms are simple but depend highly upon the design and tolerances of the antenna system and use limited calibration data and computations. Four lobe monopulse antennas, two plane interferometers, and multimode spiral antennas are examples of hardware that use simple direction finding algorithms. The accuracy of most current direction finding techniques depends upon the accuracy of the hardware in meeting the design requirements. For example, accurate direction finding using monopulse antennas and interferometers requires that the elements have identical responses, i.e., low cross-polarization response. Large costs are required to ensure that the hardware meets that requirement. Often performance is compromised, inasmuch as the hardware cannot meet the response requirements over all angles of space and polarizations. That is particularly true of the installed performance where the beams in space are influenced by the installation surroundings.

The accuracy of direction finding using a four lobe monopulse antenna is limited by the amplitude and phase balance of the excitation of the four sub-apertures and by the cross-polarization in the sum beam region. In the side lobe region direction finding using a four lobe monopulse antenna can yield ambiguities. Thus a broad beam guard antenna is typically used to discriminate between the main beam region and the side lobe region. That approach yields additional challenges in designing a guard antenna without punch-through and polarization response equal to that of the sum beam. The accuracy of direction finding using interferometers is limited by element-to-element phase errors and the fact that all elements do not have the same polarization response. Interferometer installation effects cause these accuracy limitations in many cases. Direction finding accuracy from multimode spirals are limited by the element and mode former tolerances. It is assumed that each arm yields the same antenna response rotated by the proper angle (360 degrees divided by the number of arms). In each of these examples it is desired that each antenna port (mode) have the same polarization at any given angle of space. If indeed all ports are polarization matched, the direction finding problem is greatly simplified to a two-dimensional (two angles only) identification problem. The penalty is that the antenna system cannot receive cross-polarized signals and thus direction finding cannot be obtained for all emitting sources. Another general observation about previously known direction finding techniques is that they typically do not use all of the available information. With the availability of low cost computing, limited space for antennas, and the need for increased accuracy over wider bands for all polarizations, new direction finding techniques are needed.

SUMMARY OF THE INVENTION

The present invention is a direction finding apparatus that comprises an antenna having a plurality of wave-receiving elements or ports, each being adapted to generate complex voltage signals representative of the amplitude, phase, and polarization of a plane wave X from an emitter, and a processor that receives the voltage signals and is programmed to process the voltage signals in accordance with an algorithm in which the following computations are made:

Step 1 $\quad F(\theta, \phi) = \dfrac{\text{Min}}{X} \| M(\theta, \phi)X - V \|^2, \; \forall \, X \in C^2$ Step 2 $\quad \dfrac{\text{Minimize}}{\theta, \phi} F(\theta, \phi) \Rightarrow (\theta_s, \phi_s)$ wherein V is the fixed received vector of complex voltages, MX is the port induced voltages (synthesized) by the plane wave X, Step 1 defines the plane wave and induced voltages that best match the received vector V at the specific direction and can be stated as a best plane wave, $X_b$, in terms of the pseudo-inverse of M $$X_b(\theta, \phi) = (\overline{M}^t M)^{-1} \overline{M}^t V,$$

and

Step 2 determines the direction in space for which the synthesized voltages and measured voltages are best matched and is a direction finding estimate. The residual error $R_e$ is computed as a measure of whether the chosen direction is the correct direction by $$R_e(\theta, \phi) = MX_b - V = M(\overline{M}^t M)^{-1} \overline{M}^t V - V.$$

The norm of the residual error vector is defined as the performance index $\|.\| : C^n \rightarrow R$, norm $\|R_e\|$ = Performance Index and the performance index is minimized:

$$\dfrac{\text{Minimize}}{\theta, \phi} \| R_e(\theta, \phi) \| \Rightarrow (\theta_s, \phi_s).$$

The processor is, preferably, programmed to minimize the Performance Index by an iterative optimizer routine, such as the minimum of all points, the simplex method, conjugate gradients, and Fletcher-Powell. The antenna of the apparatus may be an r-lobe monopulse, a phase interferometer, an amplitude-phase interferometer, or a multi-arm spiral.

In an exemplary implementation of the algorithm, a low noise amplifier receives the voltage signals from each antenna element and supplies amplified signals to a mixer, which down converts the low noise amplified voltage signals to an intermediate frequency. A channelized receiver receives all of the intermediate frequency signals and subdivides them into frequency bands with manageable small bandwidths for analog to digital conversion. An analog to digital converter receives each output signal from the channelized receiver and supplies digitized voltage signals to processors that implement the algorithim.

For a better understanding of the present invention, reference may be made to the following detailed description of the invention. An exemplary embodiment is also described with reference to the accompanying drawing.

DESCRIPTION OF THE DRAWING

The drawing is a schematic diagram of a system which embodies the present invention.

DETAILED DESCRIPTION OF THE INVENTION

The drawing shows a channelized direction finding system. The system includes a multi-aperature/element antenna 10 with polarization diversities. The complex antenna patterns are known for two polarizations which allows characterization for all polarizations. Output from the antenna(s) pass through a low noise amplifier 12 and a mixer 14 to down convert the signal for an intermediate frequency (IF). The IF signals are conducted to a channelized receiver 16, which subdivides the frequency bands so that the output is manageable with sufficiently small bandwidth that analog to digital converters 18 can handle the throughput. The processed digital outputs from each antenna element (at a given frequency) are sent to a computational unit for processing using the previously described least mean square algorithm to find the estimate for the direction of arrival of the emitter source. Hardware and software can be designed to provide real-time direction finding, which can be used for direction control.

The present invention involves a new direction finding technique that uses complex information from each of a plurality of antenna elements/ports and does not depend upon the absolute accuracy of the hardware. There may be differences in the antenna patterns or changes in the installed performance. The invention depends instead upon a characterization of the beams in space and requires complex measurements of the beams in space for two independent polarizations.

The invention is based upon the fact that the antenna system is linear. This is not a very restrictive condition. As a background, a few issues in the direction finding problem are considered here. Typically, the general direction finding problem is considered as a four dimensional problem, two angles and two for polarizations. Formulated in this manner, the direction finding problem is nonlinear in the two angle variables and two polarization variables. Thus, it is time consuming to search the four-dimension space for the solution to the nonlinear problem. The present invention casts the problem in a six-dimensional space in order to formulate the problem in a linear format. A key aspect to that formulation is the following fact about plane waves. All plane waves propagating in a given direction can be represented by two complex numbers. For example, a wave propagating in the z direction can be represented as $$\vec{E} = (u_1 \cdot \hat{e}_1 + u_2 \cdot \hat{e}_2) e^{-jkz}; \; u_1, u_2 \in C; \; \hat{e}_1 \cdot \hat{z} = \hat{e}_2 \cdot \hat{z} = 0 \quad (1)$$

The complex variables $u_1$ and $u_2$ contain the amplitude, phase and the polarization of the plane wave with respect to the complex linearly independent basis vectors, $\hat{e}_1$ and $\hat{e}_2$ of unit norm. Two examples are linear and circular polarization basis vectors. For the linear case, $\hat{e}_1 = \hat{x}$, and $\hat{e}_2 = \hat{y}$. And for the circular polarization case $\hat{e}_1 = (\hat{x} - j\hat{y})/\sqrt{2}$, and $\hat{e}_2 = (\hat{x} + j\hat{y})/\sqrt{2}$. With respect to fixed basis vectors, $X = [u_1, u_2]^t \in C^2$ (plane wave space at a specific angle) represents all plane waves propagating in the $\hat{z}$ direction. Given an antenna with N ports, the plane wave induces a complex voltage at each of its ports, $v = [v_1, v_2, \ldots v_N]^t$. This process can be represented by an N by 2 matrix, M, that maps plane waves into port voltages. The first and second columns of M are respectively the pattern port voltages with respect to the two polarization basis vectors, $\hat{e}_1$ and $\hat{e}_2$.

$$M: C^2 \to C^N, \; MX = V \quad (2)$$

A row of M gives the pattern values of the two polarizations for the antenna port. Since M is a linear transformation of the C vector space, the image in C is a linear subspace of dimension less than or equal to two; i.e., every antenna response lies in this subspace. Thus an arbitrary choice of port voltages is not possible; only those that lie in the image subspace. However, if errors occur in the received antenna channels, then the received signal vector may not lie in the image space of M. The direction finding optimization problem is readily defined as a two step process in terms of this formulation.

$$\text{Step 1} \quad F(\theta, \phi) = \frac{\text{Min}}{X} \|M(\theta, \phi) X - V\|^2, \; \forall \; X \in C^2 \quad (3)$$

$$\text{Step 2} \quad \frac{\text{Minimize}}{\theta, \phi} F(\theta, \phi) \Rightarrow (\theta_s, \phi_s)$$

V is the fixed received vector of complex voltages. At a specific direction in space, MX is the port induced voltages (synthesized) by the plane wave X. Step 1 defines the plane wave and induced voltages that best match the received vector V at the specific direction. Step 2 finds the direction in space for which the synthesized voltages and the measured voltages are best matched. This best direction is the direction finding estimate to the problem.

Step 1 can be easily solved since it is based upon a linear problem formulation. The best plane wave, $X_b$, at the specific direction is defined in terms of the pseudo-inverse of M.

$$X_b(\theta, \phi) = (\overline{M}^t M)^{-1} \overline{M}^t V \quad (4)$$

Recall that M is a function of theta and phi whereas V is not. The residual error in solving the linear problem is a measure whether the chosen direction is the correct direction.

$$R_e(\theta, \phi) = MX_b - V = M(\overline{M}^t M)^{-1} \overline{M}^t V - V \quad (5)$$

The norm of the residual error vector can be defined as the performance index.

$\|\cdot\|: C^n \to R, \text{ norm}$ $\|R_e\| = \text{Performance Index} \quad (6)$ The performance index is a non-negative real valued function of the direction in space. Minimization of the performance index is Step 2.

$$\frac{\text{Minimize}}{\theta, \phi} \|R_e(\theta, \phi)\| \Rightarrow (\theta_s, \phi_s) \quad (7)$$

If there are no errors in the received voltages from the emitter, then there is at least one direction in which the residual error and hence the performance index is zero. There may be more than one solution, which causes ambiguities in the direction finding.

In the case of no errors in the received voltages and more than one solution, that is not the fault of the direction finding algorithm since it provides the best direction finding estimate of all possible algorithms. Recall that the algorithm uses all of the available pattern and received signal information—amplitude, phase, and polarization—for all antennas. Also recall that the direction finding algorithm uses the available information in a unified and unbiased manner. Instead, the ambiguity situation is caused by the antenna configuration being used. That is, when there is a direction finding ambiguity, there are two direction and two plane waves that induce the same voltages at the ports. Thus, the receiver has no way to resolve the direction finding ambiguity since all of the available information has been used. To resolve the ambiguity, the antenna configuration must be changed. An additional antenna may be added as in a guard antenna, or the configuration changed so that the set of antenna patterns do not result in the ambiguous situation.

Throughout the following description of the implementation of the algorithm, it is assumed that the frequency has been determined. In a practical application, the direction finding algorithm must be implemented to simplify the hardware (CPU and memory) requirements and to achieve acceptable processing speed. Accuracy requirements, field of regard, and vehicle dynamics drive the implementation choices. Each antenna pattern and polarization must be sampled over the field of regard. One possibility is to sample the field of regard with the resolution of the desired direction finding accuracy and then select the point with the minimum performance index. That requires storing a lot of pattern data and calculating the field of regard at each of the data points. Alternatively, the data may be sampled to be the Nyquist rate and interpolated between data points. Linear, quadratic, or spline interpolation may be used, trading the number of data points for increased operational count. With pattern interpolation, the field of regard can be calculated at an arbitrary point in the field of regard. The minimum field of regard can be found using an iterative optimizer routine, such as the minimum of all points, the simplex method, conjugate gradients, and Fletcher-Powell. In this approach, the solution can be found by only computing the field of regard at those points used in the downhill search for the minimum, thus saving operations count.

The direction finding algorithm of the present invention can be used in a number of applications. In principle, the algorithm can be used as an alternative to the conventional approaches, such as r-lobe monopulse, phase interferometer, amplitude-phase interferometer, or multi-arm spiral. In an ideal situation, those approaches utilize simple algolrithms. However, the accuracy is limited by the fabrication and the installation environment influences, such as surface curvature or scattering obstacles. In the case of the 4-lobe monopulse, as typically used in airborne radar or phased arrays, four options are possible 3 ports—$\epsilon$, $\Delta_a$, $\Delta_e$
4 ports—$\epsilon$, $\Delta_a$, $\Delta_e$, $\Delta_\Delta$
4 ports—$\epsilon$, $\Delta_a$, $\Delta_e$, guard
5 ports—$\epsilon$, $\Delta_a$, $\Delta_e$, $\Delta_\Delta$, guard.

In the ideal phase interferometer, the amplitude patterns are identical. That assumption is not valid in a number of practical applications. Placement of an interferometer system on the leading edge of an airplane gives an acceptable field of regard but modifies the complex patterns. The body of a missile significantly alters the complex patterns of antennas placed around the circumference of the missile. Diffraction from the body changes the polarization and may cause shadowing. This can be used to an advantage. When linearly polarized antennas are placed around the body, the diversity of the amplitude, phase, and polarization of the patterns allows direction finding for all polarizations in a wide field of regard.

A multi-arm spiral normally uses a mode former like a Butler matrix to achieve multiple antenna patterns for direction finding. Often a four-arm spiral uses a sum (mode 1) and difference (mode 0) pattern for direction finding. The ratio of amplitudes gives theta direction finding while the difference in phases gives phi direction finding. Using only two of the four possible modes can give rise to direction finding ambiguities, especially at wider theta angles. The least mean squares direction finding algorithm can be used with the modes (ports) out of the beam former or straight out of each spiral arm. By using all of the modes or ports, there is less likelihood that there will be direction finding ambiguities. It should be noted that if the mode former is used, the antenna patterns are circularly polarized. Thus, the opposite sense circular polarization will have a signal loss and direction finding cannot be achieved. If the multi-arm antenna is a sinuous or interlog antenna with dual polarization, then the algorithm will be effective against emitting sources of any polarization.

Although one embodiment has been illustrated and described in detail, it will be understood tha various substitutions and alterations are possible without departing from the spirit and scope of the invention, as defined by the following claims.

What is claimed is:

1. Direction finding apparatus comprising
an antenna having a plurality N of wave-receiving elements, each being adapted to generate complex voltage signals representative of the amplitude, phase, and polarization of a plane wave X from an emitter; and
a processor for receiving the voltage signals and programmed to process the voltage signals in accordance with the following algorithm:
performing the following steps Step 1  $F(\theta, \phi) = \dfrac{\text{Min}}{X} \|M(\theta, \phi)X - V\|^2, \forall\, X \in C^2$ Step 2  $\dfrac{\text{Minimize}}{\theta, \phi} F(\theta, \phi) \Rightarrow (\theta_s, \phi_s)$ wherein
V is the fixed received vector of the complex voltages,
MX is the port induced voltages (synthesized) by the plane wave X,
Step 1 defines the plane wave and induced voltages that best match the received vector V at the specific direction and can be stated as a best plane wave $X_b$ in terms of the pseudo-inverse of M $X_b\,(\theta, \phi) = (\overline{M}^t M)^{-1}\, \overline{M}^t V,$ and
Step 2 determines the direction in space for which the synthesized voltages and measured voltages are best matched and is a direction finding estimate.

2. The direction finding apparatus according to claim 1 wherein the antenna is an r-lobe monopulse antenna.

3. The direction finding apparatus according to claim 1 wherein the antenna is a phase interferometer.

4. The direction finding apparatus according to claim 1 wherein the antenna is an amplitude-phase interferometer.

5. The direction finding apparatus according to claim 1 wherein the antenna is a multi-arm spiral antenna.

6. The direction finding apparatus according to claim 1 wherein the antenna is a 4-lobe monopulse antenna and the voltage signals are selected from the group consisting of 3 ports—$\epsilon$, $\Delta_a$, $\Delta_e$ 4 ports—$\epsilon$, $\Delta_a$, $\Delta_e$, $\Delta_\Delta$ 4 ports—$\epsilon$, $\Delta_a$, $\Delta_e$, guard 5 ports—$\epsilon$, $\Delta_a$, $\Delta_e$, $\Delta_\Delta$, guard.

7. The direction finding apparatus according to claim 1 and further comprising a low noise amplifier communicating with each antenna element and adapted to amplify the voltage signals, a mixer communicating with each low noise amplifier and adapted to down convert the amplified voltage signals to an intermediate frequency, a channelized receiver communicating with all of the mixers and adapted to subdivide the frequency bands and produce a plurality of output signals with manageable small bandwidths for analog to digital conversion, and an analog to digital converter receiving each output signal from the channelized receiver and supplying digitized voltage signals to the processing means.

8. The direction finding apparatus according to claim 1 and further comprising the steps of computing the residual error $R_e$ as a measure of whether the chosen direction is the correct direction by $$R_e(\theta, \phi) = MX_b - V = M(\overline{M}^t M)^{-1} \overline{M}^t V - V;$$

defining the norm of the residual error vector as the performance index $$\|.\|: C^n \rightarrow R_1 \text{ norm}$$

$$\|R_e\| = \text{Performance Index},$$

and $$\underset{\theta, \phi}{\text{Minimize}} \|R_e(\theta, \phi)\| \Rightarrow (\theta_s, \phi_s).$$

9. The direction finding apparatus according to claim 8 wherein the processor is programmed to minimize the Performance Index by an iterative optimizer routine selected from the group consisting of a minimum of all points, the simplex method, conjugate gradients, and Fletcher-Powell.

10. The direction finding apparatus according to claim 9 and further comprising a low noise amplifier communicating with each antenna element and adapted to amplify the voltage signals, a mixer communicating with each low noise amplifier and adapted to down convert the amplified voltage signals to an intermediate frequency, a channelized receiver communicating with all of the mixers and adapted to subdivide the frequency bands and produce a plurality of output signals with manageable small bandwidths for analog to digital conversion, and an analog to digital converter receiving each output signal from the channelized receiver and supplying digitized voltage signals to the processing means.

11. The direction finding apparatus according to claim 10 wherein the antenna is an r-lobe monopulse antenna.

12. The direction finding apparatus according to claim 10 wherein the antenna is a phase interferometer.

13. The direction finding apparatus according to claim 10 wherein the antenna is an amplitude-phase interferometer.

14. The direction finding apparatus according to claim 10 wherein the antenna is a multi-arm spiral antenna.

15. The direction finding apparatus according to claim 10 wherein the antenna is a 4-lobe monopulse antenna and the voltage signals are selected from the group consisting of 3 ports—$\epsilon$, $\Delta_a$, $\Delta_e$ 4 ports—$\epsilon$, $\Delta_a$, $\Delta_e$, $\Delta_\Delta$ 4 ports—$\epsilon$, $\Delta_a$, $\Delta_e$, guard 5 ports—$\epsilon$, $\Delta_a$, $\Delta_e$, $\Delta_\Delta$, guard.

* * * * *

UNITED STATES PATENT AND TRADEMARK OFFICE
CERTIFICATE OF CORRECTION

PATENT NO. : 6,127,974
DATED : October 3, 2000
INVENTOR(S) : Oren B. Kesler

It is certified that error appears in the above-identified patent and that said Letters Patent is hereby corrected as shown below:

On the title page insert item:

[57] ABSTRACT: Col. 2; line 4, after "No", delete "a priori", and insert --*a priori*--

Col. 3; line 25, after "unit" insert --20--.

Col. 3; line 58, after "as", delete

"$\vec{E} = (u_1 \cdot \hat{e}_1 + u_2 \cdot \hat{e}_2) e^{-jkz}; \; u_1, u_2 \in C; \; \hat{e}_1 \cdot \hat{z} = \hat{e}_2 \cdot \hat{z} = 0$"

and insert --

$\vec{E} = (u_1 \cdot \hat{e}_1 + u_2 \cdot \hat{e}_2) e^{-jkz}; \; u_1, u_2 \in C; \; \hat{e}_1 \cdot \hat{z} = \hat{e}_2 \cdot \hat{z} = 0$ "--.

Col. 3; Line 64, after "case", delete "$\hat{e}_1 = (\hat{x} - j\hat{y})\sqrt{2},$ "

and insert --$\hat{e}_1 = (\hat{x} - j\hat{y})/\sqrt{2},$ --.

Col. 7; line 31, after "and" insert --minimizing the performance index--.

Signed and Sealed this

Eighth Day of May, 2001

*Attest:*

NICHOLAS P. GODICI

*Attesting Officer*     *Acting Director of the United States Patent and Trademark Office*